W. H. SWAINSTON.
SAW SET.
APPLICATION FILED MAY 21, 1909.
955,999.
Patented Apr. 26, 1910.
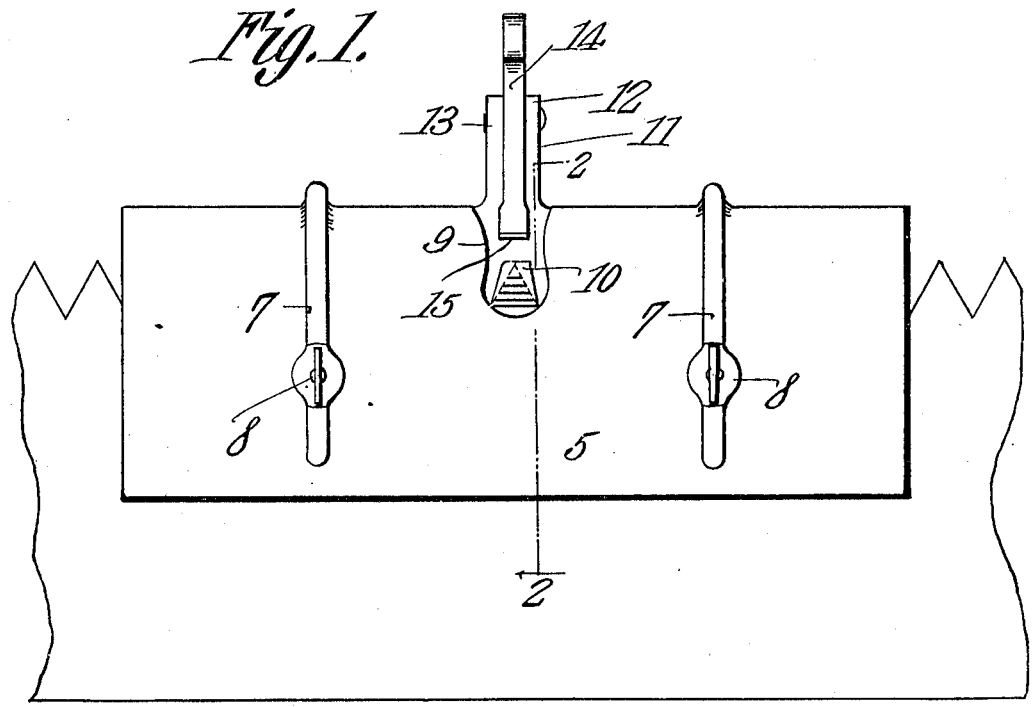
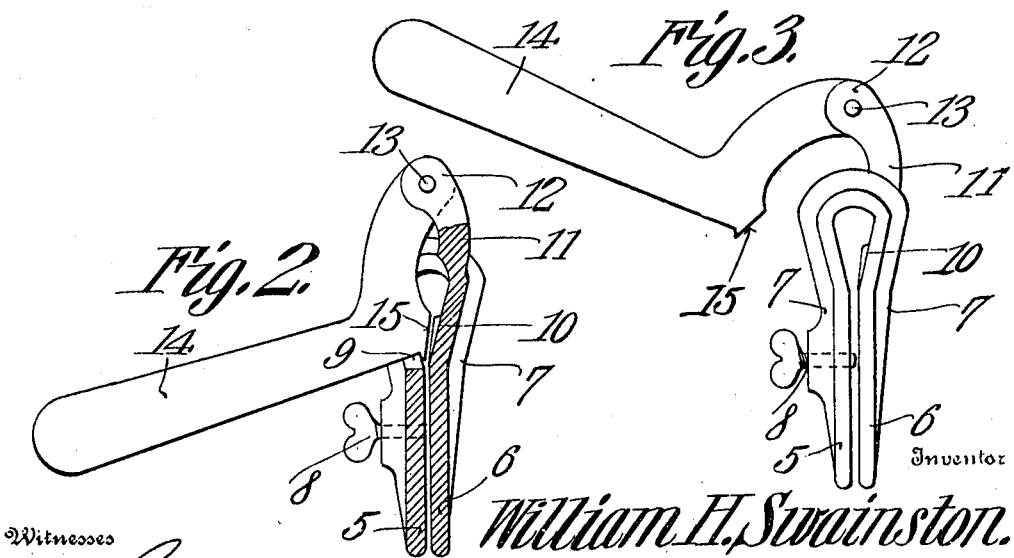
William H. Swainston,
By C. A. Snow & Co.
Attorneys
Witnesses

UNITED STATES PATENT OFFICE.

WILLIAM H. SWAINSTON, OF WOODLAWN, MICHIGAN.

SAW-SET.

955,999.  Specification of Letters Patent.  Patented Apr. 26, 1910.

Application filed May 21, 1909.  Serial No. 497,385.

*To all whom it may concern:*

Be it known that I, WILLIAM H. SWAINSTON, a citizen of the United States, residing at Woodlawn, in the county of Delta and State of Michigan, have invented a new and useful Saw-Set, of which the following is a specification.

The present invention has for its aim to provide an improved saw set in which the saw is held in a clamp carrying an anvil having an inclined face against which the saw teeth are bent by means of a hand lever.

The invention also has for its object to provide a tool of the kind stated by means of which it is possible to give every tooth of the saw the same amount of lateral bend or set.

Another object is to provide a clamp which will hold the saw tightly while being set, and which can be quickly applied or removed.

With the herein stated objects in view, the invention consists in a novel construction and arrangement of parts to be hereinafter described and claimed, reference being had to the drawing hereto annexed in which—

Figure 1 is an elevation showing the application of the invention. Fig. 2 is a vertical section on the line 2—2 of Fig. 1. Fig. 3 is an end view of the tool.

Referring to the drawing, the clamp in which the saw is held comprises front and rear plates 5 and 6 respectively, which are connected at their upper ends, and are spaced apart a suitable distance. At the top of the clamp, the space between the two plates is flared to accommodate the laterally bent saw teeth. The clamping plates are stiffened and strengthened by ribs 7. The saw is held between these plates by set screws 8 which are threaded through the front plate 5 and are adapted to impinge against the saw blade whereby the same is rigidly held between the plates.

In the top of the clamp and in the plate 5 adjacent thereto is made a recess 9 through which one tooth of the saw is exposed. In line with this recess, the plate 6 is formed with an anvil 10 having an inclined face against which the saw tooth is adapted to be bent. The anvil is integral with the rear plate 6, and as the saw blade is held rigidly against the same, the saw will not vibrate or move, by reason of which every tooth will be set exactly alike.

From the top of the clamp rises a short standard 11 having ears 12 between which is pivoted at 13 an angle lever 14 having at its elbow a flattened portion 15 adapted to engage the tooth of the saw to bend the same against the anvil 10. The lever is so located that the elbow may be swung through the recess 9 and engage the exposed saw tooth for the purpose stated.

In use, the saw is placed in the clamp as shown in Fig. 1, and alternate teeth are operated on, after which the clamp or the saw is reversed and the remaining teeth then operated on, it being understood that the teeth are alternately bent in opposite directions. The inner face of the rear plate 6 is perfectly flat, and the set screws 8 force the saw strongly and tightly against the same whereby it is held in perfect alinement. The bending lever engages all the teeth at exactly the same place, which causes each tooth to be bent at the same distance from its point. A different set is obtained by raising or lowering the clamp. The higher the point of the saw tooth is placed on the anvil, the more set the saw tooth will receive. Across the inclined face of the anvil run horizontal lines which serve as a gage to denote the different sets.

The tool herein described is simple in structure, and is easy to operate, and by its use a saw can be quickly and accurately set.

What is claimed is:

1. In a saw set, a pair of spaced plates between which the saw is received, said plates being connected at one of their ends, and said end and one of the plates adjacent thereto having a recess through which the saw tooth is exposed, an anvil on the inner face of the other plate, said anvil being in line with the recess, and having a beveled face, a bending lever swinging through the recess, and engageable with the exposed saw tooth for pressing the same against the beveled face of the anvil, and means for clamping the saw between the plates.

2. In a saw set, a pair of spaced front and rear plates connected at their upper ends, the front plate adjacent its upper end having a recess through which the saw tooth is exposed, and the space between the plates at the upper ends thereof being flared, an anvil on the inner face of the rear plate, said anvil being in line with the recess, and having a beveled face, a bending lever swinging through the recess, and engageable with the exposed saw tooth for bending the saw against the beveled face of the anvil, and means for clamping the saw between the plates.

3. In a saw set, a pair of spaced plates between which the saw is received, said plates being connected at one of their ends, and said end and one of the plates adjacent thereto having a recess through which the saw tooth is exposed, an anvil on the inner face of the other plate, a bending lever having an elbow provided with a flat face, said elbow being adapted to swing through the aforesaid recess, and the flat face thereof being engageable with the exposed saw tooth for pressing the same against the beveled face of the anvil, and means for clamping the saw between the plates.

4. In a saw set, a saw clamp comprising front and rear plates between which the saw is received, the top of the clamp and the adjacent end of the front plate having a recess, an anvil on the inner face of the rear plate, said anvil being in line with the recess, and having a beveled face, a standard rising from the top of the clamp, a bending lever fulcrumed on the standard and swinging through the recess, and engageable with the exposed tooth for pressing the same against the beveled face of the anvil, and means for clamping the saw between the front and rear plates.

In testimony that I claim the foregoing as my own, I have hereto affixed my signature in the presence of two witnesses.

WILLIAM H. SWAINSTON.

Witnesses:
 THOMAS SHANAHAN,
 JOHN I. ANDERSON.